(12) United States Patent
Hsiang (10) Patent No.: US 12,432,349 B2
(45) Date of Patent: Sep. 30, 2025

(54) METHOD AND APPARATUS OF ENTROPY CODING FOR SCALABLE VIDEO CODING

(71) Applicant: MEDIATEK INC., Hsinchu (TW)

(72) Inventor: Shih-Ta Hsiang, Hsinchu (TW)

(73) Assignee: MEDIATEK INC., Hsinchu (TW)

(*) Notice: Subject to any disclaimer, the term of this patent is extended or adjusted under 35 U.S.C. 154(b) by 0 days.

(21) Appl. No.: 18/998,301

(22) PCT Filed: Jul. 12, 2023

(86) PCT No.: PCT/CN2023/106862
§ 371 (c)(1),
(2) Date: Jan. 24, 2025

(87) PCT Pub. No.: WO2024/041249
PCT Pub. Date: Feb. 29, 2024

(65) Prior Publication Data
US 2025/0260820 A1    Aug. 14, 2025

Related U.S. Application Data

(60) Provisional application No. 63/373,472, filed on Aug. 25, 2022.

(51) Int. Cl.
*H04N 19/13* (2014.01)
*H04N 19/159* (2014.01)
(Continued)

(52) U.S. Cl.
CPC ........... *H04N 19/13* (2014.11); *H04N 19/159* (2014.11); *H04N 19/174* (2014.11); *H04N 19/1883* (2014.11); *H04N 19/91* (2014.11)

(58) Field of Classification Search
CPC .... H04N 19/13; H04N 19/159; H04N 19/174; H04N 19/1883; H04N 19/91
See application file for complete search history.

(56) References Cited

U.S. PATENT DOCUMENTS

| 2015/0334425 A1 | 11/2015 | He |
| 2019/0158837 A1 | 5/2019 | Zhang |

FOREIGN PATENT DOCUMENTS

| CN | 106331715 A | 1/2017 |
| JP | 2011055180 A | 3/2011 |
| WO | 2018122092 A1 | 7/2018 |

OTHER PUBLICATIONS

International Search Report and Written Opinion dated Sep. 22, 2023, issued in application No. PCT/CN2023/106862.
(Continued)

*Primary Examiner* — Fabio S Lima
(74) *Attorney, Agent, or Firm* — McClure, Qualey & Rodack, LLP (57) ABSTRACT

A method and apparatus of context initialization for entropy coding. According to one method, previous context states derived from one or more previous slices for an arithmetic entropy coder are determined, where the previous context states are stored in multiple context state buffers and different context state buffers are used to store the previous context states for different temporal sublayers. Target context states are determined from the previous context states for the current slice in a current temporal sublayer indicated by a current temporal ID, wherein a target context state buffer storing the target context states is determined according to the current temporal ID. A current set of context states for the arithmetic entropy coder is initialized using the target context states. The input data is encoded or decoded using the arithmetic entropy coder after said initializing the current set of context states for the arithmetic entropy coder.

20 Claims, 4 Drawing Sheets

(51) Int. Cl.
*H04N 19/169* (2014.01)
*H04N 19/174* (2014.01)
*H04N 19/91* (2014.01)

(56) References Cited

OTHER PUBLICATIONS

Nguyen, T., et al; "Core Experiment 5: Arithmetic Coding Engine;" Joint Video Experts Team (JVET) of ITU-T SG 16 WP 3 and ISO/IEC JTC 1/SC 29/WG 11; Apr. 2018; pp. 1-7.

METHOD AND APPARATUS OF ENTROPY CODING FOR SCALABLE VIDEO CODING

CROSS REFERENCE TO RELATED APPLICATIONS

The present invention is a non-Provisional Application of and claims priority to U.S. Provisional Patent Application No. 63/373,472, filed on Aug. 25, 2022. The U.S. Provisional Patent Application is hereby incorporated by reference in its entirety.

FIELD OF THE INVENTION

The present invention relates to video coding system. In particular, the present invention relates to context initialization for entropy coding in a video coding system to improve the coding performance.

BACKGROUND AND RELATED ART

Versatile video coding (VVC) is the latest international video coding standard developed by the Joint Video Experts Team (JVET) of the ITU-T Video Coding Experts Group (VCEG) and the ISO/IEC Moving Picture Experts Group (MPEG). The standard has been published as an ISO standard: ISO/IEC 23090-3:2021, Information technology—Coded representation of immersive media—Part 3: Versatile video coding, published February 2021. VVC is developed based on its predecessor HEVC (High Efficiency Video Coding) by adding more coding tools to improve coding efficiency and also to handle various types of video sources including 3-dimensional (3D) video signals.

Figure 1A:
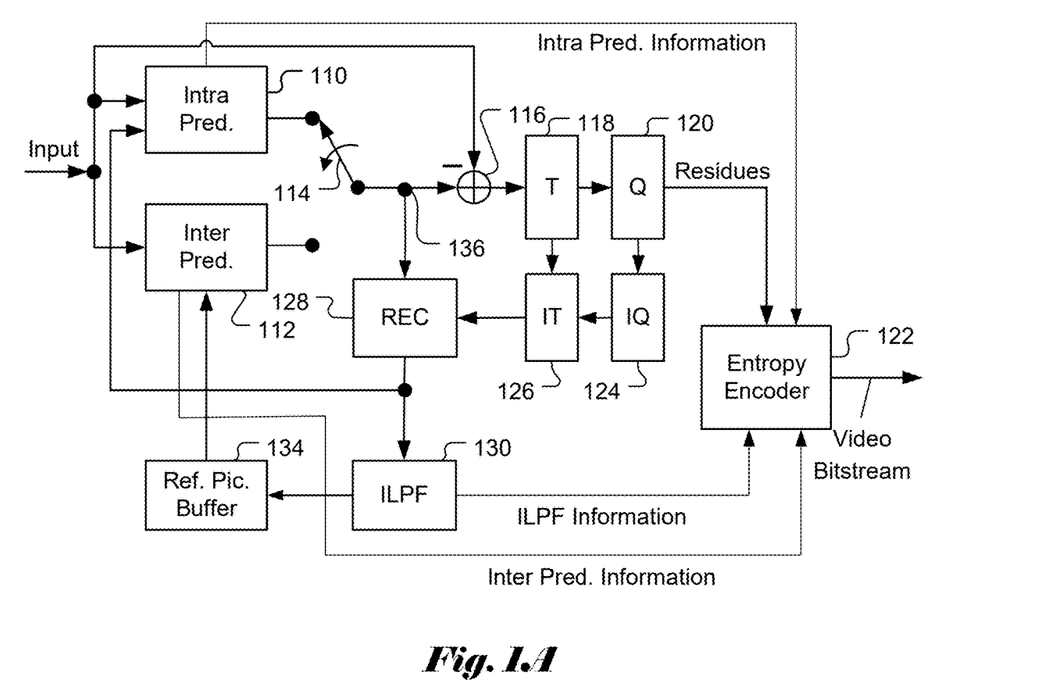
FIG. 1A illustrates an exemplary adaptive Inter/Intra video coding system incorporating loop processing.

FIG. 1A illustrates an exemplary adaptive Inter/Intra video coding system incorporating loop processing. For Intra Prediction, the prediction data is derived based on previously coded video data in the current picture. For Inter Prediction 112, Motion Estimation (ME) is performed at the encoder side and Motion Compensation (MC) is performed based on the result of ME to provide prediction data derived from other picture(s) and motion data. Switch 114 selects Intra Prediction 110 or Inter-Prediction 112 and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to be included in a video bitstream corresponding to the compressed video data. The bitstream associated with the transform coefficients is then packed with side information such as motion and coding modes associated with Intra prediction and Inter prediction, and other information such as parameters associated with loop filters applied to underlying image area. The side information associated with Intra Prediction 110, Inter prediction 112 and in-loop filter 130, are provided to Entropy Encoder 122 as shown in FIG. 1A. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, in-loop filter 130 is often applied to the reconstructed video data before the reconstructed video data are stored in the Reference Picture Buffer 134 in order to improve video quality. For example, deblocking filter (DF), Sample Adaptive Offset (SAO) and Adaptive Loop Filter (ALF) may be used. The loop filter information may need to be incorporated in the bitstream so that a decoder can properly recover the required information. Therefore, loop filter information is also provided to Entropy Encoder 122 for incorporation into the bitstream. In FIG. 1A, Loop filter 130 is applied to the reconstructed video before the reconstructed samples are stored in the reference picture buffer 134. The system in FIG. 1A is intended to illustrate an exemplary structure of a typical video encoder. It may correspond to the High Efficiency Video Coding (HEVC) system, VP8, VP9, H.264 or VVC.

Figure 1B:
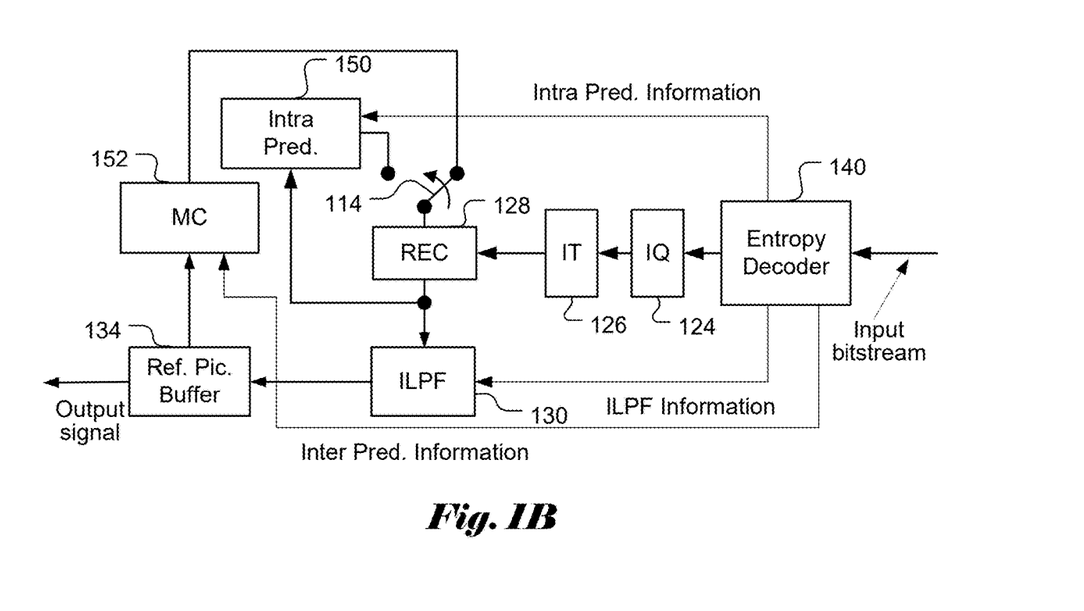
FIG. 1B illustrates a corresponding decoder for the encoder in FIG. 1A.

The decoder, as shown in FIG. 1B, can use similar or portion of the same functional blocks as the encoder except for Transform 118 and Quantization 120 since the decoder only needs Inverse Quantization 124 and Inverse Transform 126. Instead of Entropy Encoder 122, the decoder uses an entropy decoder 140 to decode the video bitstream into quantized transform coefficients and needed coding information (e.g., ILPF information, Intra prediction information and Inter prediction information). The Intra prediction 150 at the decoder side does not need to perform the mode search. Instead, the decoder only need to generate Intra prediction according to Intra prediction information received from the Entropy Decoder 140. Furthermore, for Inter prediction, the decoder only needs to perform motion compensation (MC 152) according to Intra prediction information received from the Entropy Decoder 140 without the need for motion estimation.

A coded video sequence can be represented by a collection of coded layered video sequences. The layered coding is intended for scalable coding such as scalable quality and/or scalable resolution. The layered coding can also be applied to multi-view coding with different layers corresponding to different views. A coded layered video sequence can be further divided into more than one temporal sublayer. Each coded video data unit belongs to one particular layer identified by the layer index (ID) and one particular sublayer ID identified by the temporal ID. Both layer ID and sublayer ID are signalled in a network abstraction layer (NAL) header. A coded video sequence can be recovered at reduced quality or frame rate by skipping video data units belonging to one or more highest layers or sublayers. The video parameter set (VPS), the sequence parameter set (SPS) and the picture parameter set (PPS) contain high-level syntax elements that apply to a coded video sequence, a coded layered video sequence and a coded picture, respectively. The picture header (PH) and slice header (SH) contain high-level syntax elements that apply to a current coded picture and a current coded slice, respectively.

In VVC, a coded picture is partitioned into non-overlapped square block regions represented by the associated coding tree units (CTUs). A coded picture can be represented by a collection of slices, each comprising an integer number of CTUs. The individual CTUs in a slice are processed in raster-scan order. A bi-predictive (B) slice may be decoded using intra prediction or inter prediction with at most two motion vectors and reference indices to predict the sample values of each block. A predictive (P) slice is decoded using intra prediction or inter prediction with at most one motion vector and reference index to predict the sample values of each block. An intra (I) slice is decoded using intra prediction only.

Figure 2:
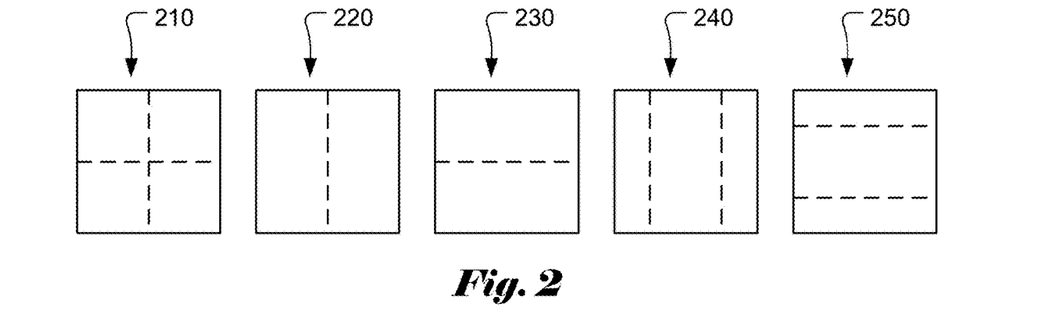
FIG. 2 illustrates that a CU can be split into smaller CUs using one of the five split types (quad-tree partitioning, vertical binary tree partitioning, horizontal binary tree partitioning, vertical centre-side triple-tree partitioning, and horizontal centre-side triple-tree partitioning).
Figure 3:
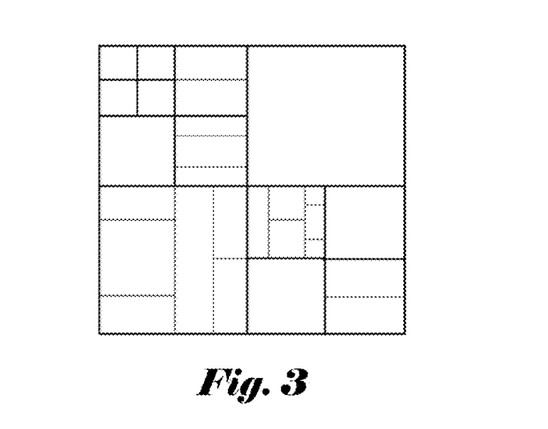
FIG. 3 illustrates an example of a CTU being recursively partitioned by QT with the nested MTT.

A CTU can be partitioned into one or multiple non-overlapped coding units (CUs) using the quadtree (QT) with nested multi-type-tree (MTT) structure to adapt to various local motion and texture characteristics. A CU can be further split into smaller CUs using one of the five split types (quad-tree partitioning 210, vertical binary tree partitioning 220, horizontal binary tree partitioning 230, vertical centre-side triple-tree partitioning 240, horizontal centre-side triple-tree partitioning 250) illustrated in FIG. 2. FIG. 3 provides an example of a CTU recursively partitioned by QT with the nested MTT. Each CU contains one or more prediction units (PUs). The prediction unit, together with the associated CU syntax, works as a basic unit for signalling the predictor information. The specified prediction process is employed to predict the values of the associated pixel samples inside the PU. Each CU may contain one or more transform units (TUs) for representing the prediction residual blocks. A transform unit (TU) comprises of a transform block (TB) of luma samples and two corresponding transform blocks of chroma samples and each TB correspond to one residual block of samples from one colour component. An integer transform is applied to a transform block. The level values of quantized coefficients together with other side information are entropy coded in the bitstream. The terms coding tree block (CTB), coding block (CB), prediction block (PB), and transform block (TB) are defined to specify the 2-D sample array of one colour component associated with CTU, CU, PU, and TU, respectively. Thus, a CTU consists of one luma CTB, two chroma CTBs, and associated syntax elements. A similar relationship is valid for CU, PU, and TU.

Figure 4:
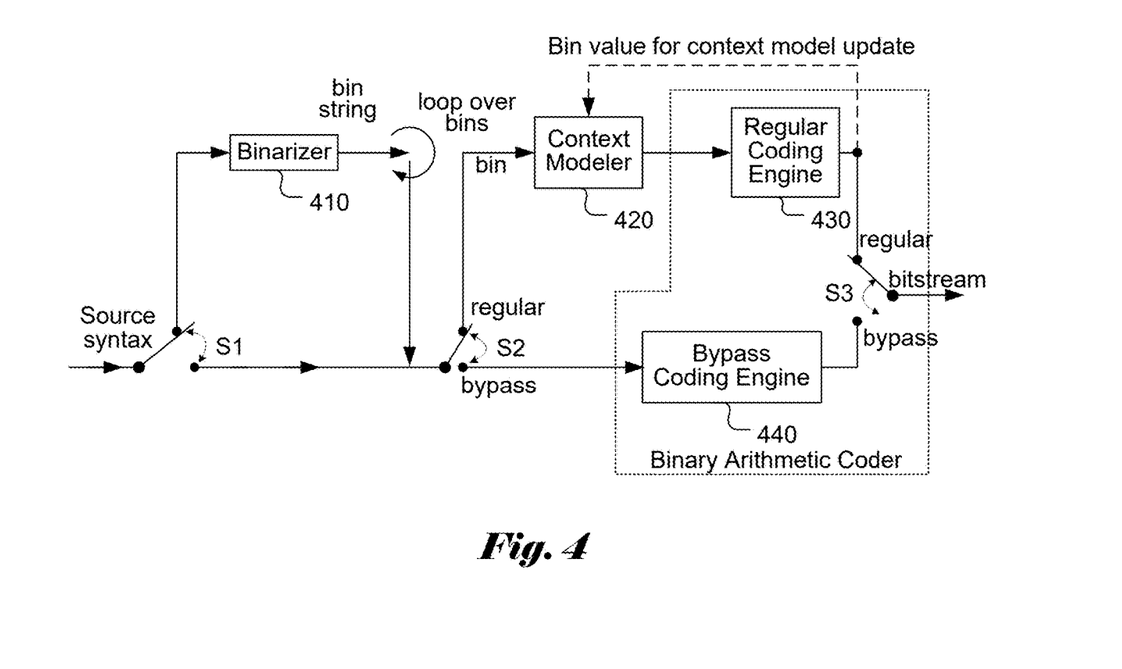
FIG. 4 illustrates an exemplary block diagram of the CABAC process.

For achieving high compression efficiency, the context-based adaptive binary arithmetic coding (CABAC) mode, or known as regular mode, is employed for entropy coding the values of the syntax elements in HEVC and VVC. FIG. 4 illustrates an exemplary block diagram of the CABAC process. Since the arithmetic coder in the CABAC engine can only encode the binary symbol values, the CABAC process needs to convert the values of the syntax elements into a binary string using a binarizer (410). The conversion process is commonly referred to as binarization. During the coding process, the probability models are gradually built up from the coded symbols for the different contexts. The context modeller (420) serves the modelling purpose. During normal context based coding, the regular coding engine (430) is used, which corresponds to a binary arithmetic coder. The selection of the modelling context for coding the next binary symbol can be determined by the coded information. Symbols can also be encoded without the context modelling stage and assume an equal probability distribution, commonly referred to as the bypass mode, for reduced complexity. For the bypassed symbols, a bypass coding engine (440) may be used. As shown in FIG. 4, switches (S1, S2 and S3) are used to direct the data flow between the regular CABAC mode and the bypass mode. When the regular CABAC mode is selected, the switches are flipped to the upper contacts. When the bypass mode is selected, the switches are flipped to the lower contacts as shown in FIG. 4.

For achieving high compression efficiency, the context-based adaptive binary arithmetic coding (CABAC) mode, or known as regular mode, is employed for entropy coding the values of the syntax elements in VVC. As the arithmetic coder in the CABAC engine can only encode the binary symbol values, the CABAC operation first needs to convert the value of a syntax element into a binary string, the process commonly referred to as binarization. During the coding process, the accurate probability models are gradually built up from the coded symbols for the different contexts. A set of storage units is allocated to trace the on-going context state, including accumulated probability state, for individual modelling contexts. The context states are initialized using the pre-defined modelling parameters for each context according to the specified slice QP. The selection of a particular modelling context for coding a binary symbol can be determined by a pre-defined rule or derived from the coded information. Symbols can be coded without the context modelling stage and assume an equal probability distribution, commonly referred to as the bypass mode, for improving bitstream parsing throughput rate.

Joint Video Expert Team (JVET) of ITU-T SG16 WP3 and ISO/IEC JTC1/SC29 are currently in the process of exploring the next-generation video coding standard. Some promising new coding tools have been adopted into Enhanced Compression Model 5 (ECM 5) (M. Coban, et al., "Algorithm description of Enhanced Compression Model 5 (ECM 5)," Joint Video Expert Team (JVET) of ITU-T SG 16 WP 3 and ISO/IEC JTC 1/SC 29, 26th Meeting, by teleconference, 20-29 Apr. 2022, Document JVET-Z2025) to further improve VVC. The adopted new tools have been implemented in the reference software ECM-5.0 (available online: https://vcgit.hhi.fraunhofer.de/ecm/ECM).

The present invention is intended to further improve the performance of the CABAC entropy coding in a video coding system.

BRIEF SUMMARY OF THE INVENTION

A method and apparatus of context initialization for entropy coding are disclosed. According to this method, input data are received, wherein the input data comprise binary symbols for a set of syntax elements associated with a current slice in a current picture at an encoder side, or entropy coded bitstream of the binary symbols for the set of syntax elements at a decoder side, and wherein the current picture is inter coded with multiple temporal sublayers. Previous context states derived from one or more previous slices for an arithmetic entropy coder are determined, wherein the previous context states are stored in multiple context state buffers and different context state buffers are used to store the previous context states for different temporal sublayers. Target context states are determined from the previous context states for the current slice in a current temporal sublayer indicated by a current temporal ID, wherein a target context state buffer storing the target context states is determined according to the current temporal ID. A current set of context states for the arithmetic entropy coder is initialized using the target context states. The input data is encoded or decoded using the arithmetic entropy coder after said initializing the current set of context states for the arithmetic entropy coder.

In one embodiment, each of the context state buffers stores only said one or more sets of context states generated from coded pictures with a target temporal sublayer ID.

In one embodiment, the context state buffers correspond to a two-dimensional array of context state buffer with a slice type as a first dimension and a temporal sublayer ID as a second dimension.

In one embodiment, different context state buffers have different maximum context state buffer sizes.

In one embodiment, the current picture is also inter coded using multiple layers and said different context state buffers are also used to store the previous context states for different layers, and wherein the target context state buffer containing the target context states for the current slice in a current layer indicated by a current layer ID is further determined according to the current layer ID. In one embodiment, each of the multiple context state buffers stores only the previous context states generated from coded pictures associated with one temporal ID and one target layer ID. In one embodiment, the multiple context state buffers correspond to a three-dimensional array of context state buffers with a slice type as a first dimension, a temporal ID as a second dimension, and a layer ID as a third dimension.

In one embodiment, the method comprises storing the current set of context states resulted from said encoding or decoding the input data in the multiple context state buffers if the current slice satisfies a pre-defined position in the current picture. For example, the pre-defined position corresponds to a last slice in the current picture. In another example, the pre-defined position corresponds to a centre slice in the current picture. In one embodiment, after the current slice with the current temporal ID is entropy coded, the current set of context states is stored in a selected context state buffer having a corresponding temporal ID equal to the current temporal ID. In one embodiment, if the selected context state buffer having the corresponding temporal ID equal to the current temporal ID is full, one buffer entry in the multiple context state buffers is emptied before storing the current set of context states.

According to another method, input data are received, wherein the input data comprise binary symbols for a set of syntax elements associated with a current slice in a current picture at an encoder side, or entropy coded bitstream of the binary symbols for the set of syntax elements at a decoder side, and wherein the current picture is inter coded with multiple temporal sublayers. Previous context states for an arithmetic entropy coder are determined, wherein the previous context states are derived from entropy coding one or more previous slices and are stored in a context state buffer for said one or more previous slices having a same slice type. Target context states are determined, from the previous context states stored in the context state buffer, for the current slice with a current temporal ID, wherein the target context states are associated with a target temporal ID and the target temporal ID is allowed to be smaller than the current temporal ID. A current set of context states for the arithmetic entropy coder is initialized using the target context states. The input data are encoded or decoded using the arithmetic entropy coder after said initializing the current set of context states for the arithmetic entropy coder.

In one embodiment, the current slice is coded with a current QP (Quantization Parameter) and the target context states are associated with a target QP, and wherein an absolute difference between the current QP and the target QP is smaller than a threshold and the threshold is a non-negative integer. In one embodiment, the threshold is signalled or parsed in an SPS (Sequence Parameter Set), a PPS (Picture Parameter Set), a PH (Picture Header), a SH (Slice Header) or a combination thereof. In another embodiment, the threshold is pre-defined.

In one embodiment, the method further comprises storing the current set of context states resulted from said encoding or decoding the input data in the context state buffer if the current slice satisfies a pre-defined position in the current picture. For example, the pre-defined position corresponds to a last slice in the current picture. In another example, the pre-defined position corresponds to a centre slice in the current picture.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention. References throughout this specification to "one embodiment," "an embodiment," or similar language mean that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention. The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

In ECM 5, the set of the context states after entropy coding the last CTU in a coded inter picture can be used to initialize the set of the context states for entropy coding a future inter slice having the same slice type, quantization parameter (QP), and temporal ID (TID) as the coded picture. A new set of the context states after entropy coding a current inter picture is stored in an assigned entry of a context state buffer in a video coder. When a stored set of context states that is generated by entropy coding a previous inter slice having the same slice type, QP, and TID as the current picture can be found in the context state buffer, the new set of the context states just replaces the stored set of context states corresponding to the same slice type, QP, and TID in the context state buffer. Otherwise, the new set of the context states is assigned to be stored in an empty entry in the context state buffer. When the context state buffer is already full, the stored context set associated with the entry having the smallest QP and temporal ID is removed first from the context state buffer before storing the new set of context states. In ECM-5.0 reference software implementation, an array of context state buffers ctxStateBuffers[NumInterSliceTypes] is created for storage of the sets of context states corresponding to different slice types, wherein NumInterSliceTypes indicates the number of different slice types and is equal to 2 (referring to B and P slice types in ECM 5). Each context state buffer stores the sets of context states that are resulted from entropy coding inter slices in previous pictures using one particular slice type. The allowed maximum buffer size is fixed to be equal to 5 (sets of context states) for each of the two context state buffers. The context state for each context in a stored set may include entries for tracing long-term probability, short-term probability, and weighting factors for deriving the predicted probability.

Before starting entropy coding a current inter slice, the ECM 5 video coder will first search the context state buffer for a stored set of context states having the same slice type, QP, and TID as the current slice. The slice type, QP, and TID are referred as coding parameters in this disclosure. Accordingly, a set of context states is stored for each coding parameter combination (i.e., slice type, QP, and TID). If such a stored set can be found, the video coder will copy each context state in the stored set to the corresponding context state in the current slice. Otherwise, the set of the context states in the current slice are not initialized by any stored set of context states in the context state buffer. The context states in the current slice are just initialized by the pre-defined default method in VVC.

In ECM-5.0, each context state buffer is employed to store sets of context states that are generated from the coded slices in one particular slice type. The sets of context states corresponding to the same slice type and different TIDs are all stored in one context buffer. When the context state buffer is full, it needs to remove one stored entry from the context state buffer to store a new set of context states after entropy coding a current picture. However, when the coded pictures corresponding to one or more higher temporal sublayers (indicated by TID associated with each coded picture) are not decoded by the decoder, the number of the stored sets generated from the coded pictures are reduced. The status of context state buffer fullness may thus be out of synchronization between the encoder and the decoder.

In one proposed method, a video coder may maintain separate context state buffers for different temporal sublayers. Each context state buffer only stores the sets of context states that are generated from the coded pictures corresponding to one particular TID in a coded video sequence. To store a new set of context states after entropy coding a current slice having a TID value equal to TemporalId$_c$, a video coder will search for an empty entry in the context state buffer corresponding to TemporalId$_c$. When the buffer corresponding to TemporalId$_c$ is full, it will empty a buffer entry for storing the new set of context states. In one embodiment, a video coder may create a two-dimensional array of context state buffers ctxStateBuffers[NumSubLayers][NumInterSliceTypes] for storage of the sets of context states corresponding to different TIDs and slice types, wherein NumSubLayers indicates the number of temporal sublayers in a coded video sequence. Each context state buffer ctxStateBuffers [TemporalId][SliceType] only stores the sets of context states that are generated by entropy coding the inter slices all having their TID values equal to TemporalId and their slice type values equal to SliceType. The video coder may set different values of maximum context state buffer sizes for different context state buffers, wherein the maximum context state buffer sizes can be either pre-defined or explicitly signalled in the bitstream, such as in the SPS or PPS. In ECM 5, two context state buffers are used for B slices and P slices, where the context statistics are collected the picture type (i.e., B and P) on a slice basis. The slices can be generated based on other picture partitions.

According to one aspect of the present invention, a video coder may further allow to use a stored set of context states having a lower TID value than that of the current picture for context initialization. In this way, a video coder may further improve the chance of initializing context states for entropy coding a current picture using a stored set of context states generated from a coded previous picture. The video coder may further comprise a specified threshold TL0, where TL0 is a non-negative integer. Consider a current slice having a QP value equal to QP$_c$ and a temporal ID value equal to temporalID$_c$ and a stored context set k that is generated by entropy coding a previous inter slice having a QP value equal to QP$_k$ and a temporal ID value equal to temporalID$_k$. When the absolute difference between QP$_c$ and QP$_k$ is less than or equal to TL0 and temporalID$_k$ is less than temporalID$_c$, the stored context set k may be allowed to be utilized for initialization of context states for entropy coding the current slice.

In one embodiment, after entropy coding the last slice in the current picture, the current context states can be stored in the context buffer for initializing the entropy coder for a next picture. While the context states for the last slice in a current picture are stored, the context states associated another slice location within a picture can be stored. For example, the context states for a centre slice in the current picture can be stored instead of the last slice.

When more than one stored context set is allowed, the video coder may choose the stored context set from the more than one stored set by some pre-defined methods. In some embodiments, a video coder may consider the TID, QP, decoding order or POC corresponding to each of the more than one stored set to determine the selected set for initialization of context states in the current picture. For example, the video coder may first choose the stored set corresponding to the nearest TID to temporalID$_c$. In some embodiments, the video coder will always first choose the stored set having the same sliced type, QP and TID as the current slice before considering the other stored sets corresponding to different TID values. The value of the specified threshold TL0 can be either pre-defined or signalled in the bitstream, such as in the SPS or PPS. In some embodiments, different values of TL0 can be specified and derived for entropy coding inter slices corresponding to different slice types and TIDs.

According to another aspect of the present invention, a video coder may further comprise explicitly signalling one or more syntax elements for deriving the selected one or more stored sets of context states used for initialization of context states for entropy coding a current slice. The video coder may further comprise explicitly signalling one or more syntax elements for deriving the selected one or more stored sets of context states to be kept in or removed from a context state buffer. The one or more selected stored set of context states may be derived by signalling information related to the slice type, QP, picture order count (POC), and/or buffer entry index associated with each of the one or more selected stored sets, or by other pre-defined methods.

In the proposed method, a video coder may further comprise maintaining separate context state buffers for different layers and temporal sublayers when a coded video sequence is coded into multiple layers. Each context state buffer only stores the sets of context states that are generated from the coded pictures corresponding to one particular layer ID and one particular TID in a coded video sequence. In one embodiment, a video coder may create a three-dimensional array of context state buffers, such as ctxStateBuffers[NumLayers][NumSubLayers][NumInterSliceTypes] for storage of the sets of context states corresponding to different layer IDs, TIDs and slice types, wherein NumLayers indicates the number of layers in a coded video sequence. Each context state buffer ctxStateBuffers[LayerId][TemporalId][SliceType] only stores the sets of context states that are generated by entropy coding inter slices having their layer index values equal to LayerId and their TID values equal to TemporalId and their slice types equal to SliceType. The video coder may set different values of maximum context state buffer sizes for different context state buffers, wherein the maximum context state buffer sizes can be either pre-defined or explicitly signalled in the bitstream, such as in the SPS or PPS.

The video coder may further allow to use the stored set of context states having a lower layer ID than that of the current picture for context initialization when a coded video sequence is coded into multiple layers. The proposed schemes and embodiments for context initialization using the stored set of context states having a lower TID value than that of the current slice can be similarly applied using the stored set of context states having a lower layer ID than that of the current slice.

In ECM-5.0, the two context state buffers are assigned to store sets of context states resulted from entropy coding B slices and P slices, respectively. Each context state buffer can store up to five sets of context states for each inter slice type. However, it is common that inter slice types are not evenly distributed in a bitstream. According to another aspect of the present invention, a video coder may share the total context state buffer size budget among different slice types. In this way, when one inter slice type is not employed in a current bitstream, the total context state buffer size budget can be used by the other inter slice type. According to a further aspect of the present invention, each context state buffer may store the sets of context states that are generated by the slices coded in different slice types in a video coder. In this way, the sets of context states generated from two different slices can share one context buffer. According to another aspect of the present invention, a video coder may further allow to use the stored set of context states having a different slice type from the current slice type for context initialization.

The proposed methods can be jointly supported in a video coder. The video coder may further comprise signalling one or more high-level syntax elements in the high-level syntax set such as the SPS, PPS, PH, and SH to indicate which method is selected for context initialization in a current video sequence.

Any of the foregoing proposed entropy coding methods with individual context state buffers for different temporal sublayers or using a stored set of context states having a lower temporal ID value than a current temporal ID value for initialization of entropy coding can be implemented in encoders and/or decoders. For example, any of the proposed entropy coding methods can be implemented in the entropy coding module (e.g., Entropy Encoder 122 in FIG. 1A) of an encoder, and/or the entropy coding module (e.g., Entropy Decoder 140 in FIG. 1B) of a decoder. Alternatively, any of the proposed methods can be implemented as a circuit integrated to the entropy coding module of an encoder, and/or the entropy coding module of a decoder. The proposed aspects, methods and related embodiments can be implemented individually and jointly in a video coding system.

Figure 5:
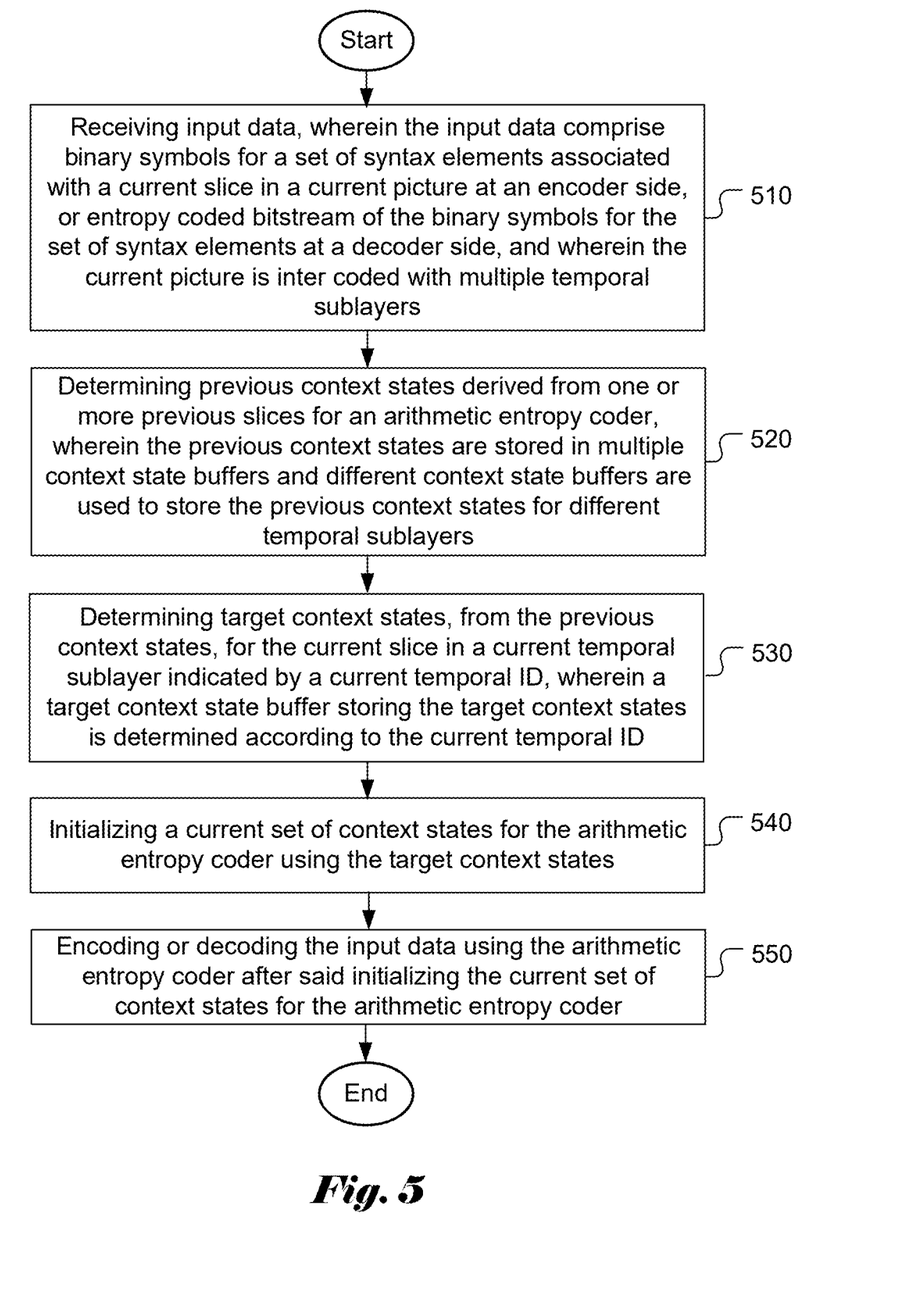
FIG. 5 illustrates a flowchart of an exemplary video coding system that comprises entropy coding with individual context state buffers for different temporal sublayers according to an embodiment of the present invention.

FIG. 5 illustrates a flowchart of an exemplary video coding system that comprises entropy coding with individual context state buffers for different temporal sublayers according to an embodiment of the present invention. The steps shown in the flowchart may be implemented as program codes executable on one or more processors (e.g., one or more CPUs) at the encoder/decoder side. The steps shown in the flowchart may also be implemented based hardware such as one or more electronic devices or processors arranged to perform the steps in the flowchart. According to this method, input data are received in step 510, wherein the input data comprise binary symbols for a set of syntax elements associated with a current slice in a current picture at an encoder side, or entropy coded bitstream of the binary symbols for the set of syntax elements at a decoder side, and wherein the current picture is inter coded with multiple temporal sublayers. Previous context states derived from one or more previous slices are determined for an arithmetic entropy coder in step 520, wherein the previous context states are stored in multiple context state buffers and different context state buffers are used to store the previous context states for different temporal sublayers. Target context states are determined in step 530, from the previous context states, for the current slice in a current temporal sublayer indicated by a current temporal ID, wherein a target context state buffer storing the target context states is determined according to the current temporal ID. A current set of context states for the arithmetic entropy coder is initialized using the target context states in step 540. The input data are encoded or decoded using the arithmetic entropy coder after said initializing the current set of context states for the arithmetic entropy coder in step 550.

Figure 6:
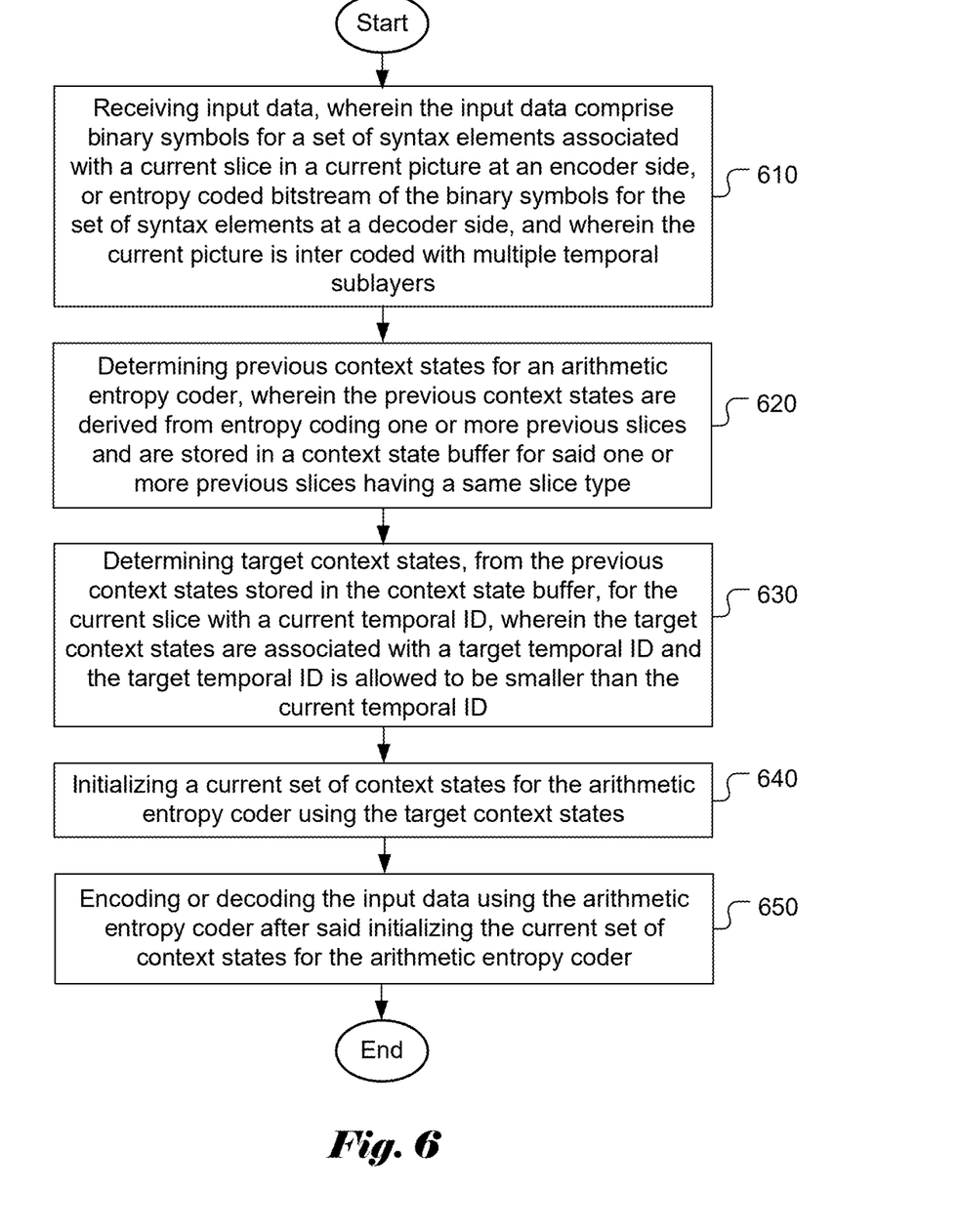
FIG. 6 illustrates a flowchart of an exemplary video coding system that allows to use a stored set of context states having a lower temporal ID value than a current temporal ID value for initialization of entropy coding according to an embodiment of the present invention.

FIG. 6 illustrates a flowchart of an exemplary video coding system that allows to use a stored set of context states having a lower temporal ID value than a current temporal ID value for initialization of entropy coding according to an embodiment of the present invention. According to this method, input data are received in step 610, wherein the input data comprise binary symbols for a set of syntax elements associated with a current slice in a current picture at an encoder side, or entropy coded bitstream of the binary symbols for the set of syntax elements at a decoder side, and wherein the current picture is inter coded with multiple temporal sublayers. Previous context states for an arithmetic entropy coder are determined in step 620, wherein the previous context states are derived from entropy coding one or more previous slices and are stored in a context state buffer for said one or more previous slices having a same slice type. Target context states are determined in step 630, from the previous context states stored in the context state buffer, for the current slice with a current temporal ID, wherein the target context states are associated with a target temporal ID and the target temporal ID is allowed to be smaller than the current temporal ID. A current set of context states for the arithmetic entropy coder is initialized using the target context states in step 640. The input data are encoded or decoded using the arithmetic entropy coder after said initializing the current set of context states for the arithmetic entropy coder in step 650.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding, the method comprising:
   receiving input data, wherein the input data comprise binary symbols for a set of syntax elements associated with a current slice in a current picture at an encoder side, or entropy coded bitstream of the binary symbols for the set of syntax elements at a decoder side, and wherein the current picture is inter coded with multiple temporal sublayers;
   determining previous context states derived from one or more previous slices for an arithmetic entropy coder, wherein the previous context states are stored in multiple context state buffers and different context state buffers are used to store the previous context states for different temporal sublayers;
   determining target context states, from the previous context states, for the current slice in a current temporal sublayer indicated by a current temporal ID, wherein a target context state buffer storing the target context states is determined according to the current temporal ID;
   initializing a current set of context states for the arithmetic entropy coder using the target context states; and
   encoding or decoding the input data using the arithmetic entropy coder after said initializing the current set of context states for the arithmetic entropy coder.

2. The method of claim 1, wherein each of the multiple context state buffers stores only said one or more sets of context states generated from coded pictures with a target temporal ID.

3. The method of claim 1, wherein the multiple context state buffers correspond to a two-dimensional array of context state buffer with a slice type as a first dimension and a temporal ID as a second dimension.

4. The method of claim 1, wherein said different context state buffers have different maximum context state buffer sizes.

5. The method of claim 1, wherein the current picture is also inter coded using multiple layers and said different context state buffers are also used to store the previous context states for different layers, and wherein the target context state buffer containing the target context states for the current slice in a current layer indicated by a current layer ID is further determined according to the current layer ID.

6. The method of claim 5, wherein each of the multiple context state buffers stores only the previous context states generated from coded pictures associated with one temporal ID and one target layer ID.

7. The method of claim 5, wherein the multiple context state buffers correspond to a three-dimensional array of context state buffers with a slice type as a first dimension, a temporal ID as a second dimension, and a layer ID as a third dimension.

8. The method of claim 1, further comprising storing the current set of context states resulted from said encoding or decoding the input data in the multiple context state buffers if the current slice satisfies a pre-defined position in the current picture.

9. The method of claim 8, wherein the pre-defined position corresponds to a last slice in the current picture.

10. The method of claim 8, wherein the pre-defined position corresponds to a centre slice in the current picture.

11. The method of claim 8, wherein after the current slice with the current temporal ID is entropy coded, the current set of context states is stored in a selected context state buffer having a corresponding temporal ID equal to the current temporal ID.

12. The method of claim 11, wherein if the selected context state buffer having the corresponding temporal ID equal to the current temporal ID is full, one buffer entry in the multiple context state buffers is emptied before storing the current set of context states.

13. An apparatus of video coding, the apparatus comprising one or more electronic circuits or processors arranged to:
receive input data, wherein the input data comprise binary symbols for a set of syntax elements associated with a current slice in a current picture at an encoder side, or entropy coded bitstream of the binary symbols for the set of syntax elements at a decoder side, and wherein the current picture is inter coded with multiple temporal sublayers;
determine previous context states derived from one or more previous slices for an arithmetic entropy coder, wherein the previous context states are stored in multiple context state buffers and different context state buffers are used to store the previous context states for different temporal sublayers;
determine target context states, from the previous context states, for the current slice in a current temporal sublayer indicated by a current temporal ID, wherein a target context state buffer storing the target context states is determined according to the current temporal ID;
initialize a current set of context states for the arithmetic entropy coder using the target context states; and
encode or decode the input data using the arithmetic entropy coder after the current set of context states for the arithmetic entropy coder is initialized.

14. A method of video coding, the method comprising:
receiving input data, wherein the input data comprise binary symbols for a set of syntax elements associated with a current slice in a current picture at an encoder side, or entropy coded bitstream of the binary symbols for the set of syntax elements at a decoder side, and wherein the current picture is inter coded with multiple temporal sublayers;
determining previous context states for an arithmetic entropy coder, wherein the previous context states are derived from entropy coding one or more previous slices and are stored in a context state buffer for said one or more previous slices having a same slice type;
determining target context states, from the previous context states stored in the context state buffer, for the current slice with a current temporal ID, wherein the target context states are associated with a target temporal ID and the target temporal ID is allowed to be smaller than the current temporal ID;
initializing a current set of context states for the arithmetic entropy coder using the target context states; and
encoding or decoding the input data using the arithmetic entropy coder after said initializing the current set of context states for the arithmetic entropy coder.

15. The method of claim 14, wherein the current slice is coded with a current QP (Quantization Parameter) and the target context states are associated with a target QP, and wherein an absolute difference between the current QP and the target QP is smaller than a threshold and the threshold is a non-negative integer.

16. The method of claim 15, wherein the threshold is signalled or parsed in an SPS (Sequence Parameter Set), a PPS (Picture Parameter Set), a PH (Picture Header), a SH (Slice Header) or a combination thereof.

17. The method of claim 15, wherein the threshold is pre-defined.

18. The method of claim 14, further comprising storing the current set of context states resulted from said encoding or decoding the input data in the context state buffer if the current slice satisfies a pre-defined position in the current picture.

19. The method of claim 18, wherein the pre-defined position corresponds to a last slice in the current picture.

20. The method of claim 18, wherein the pre-defined position corresponds to a centre slice in the current picture.

* * * * *